Dec. 17, 1968   N. S. VALENTINE   3,416,841
APPARATUS FOR CONVEYING ARTICLES
Filed Sept. 11, 1967
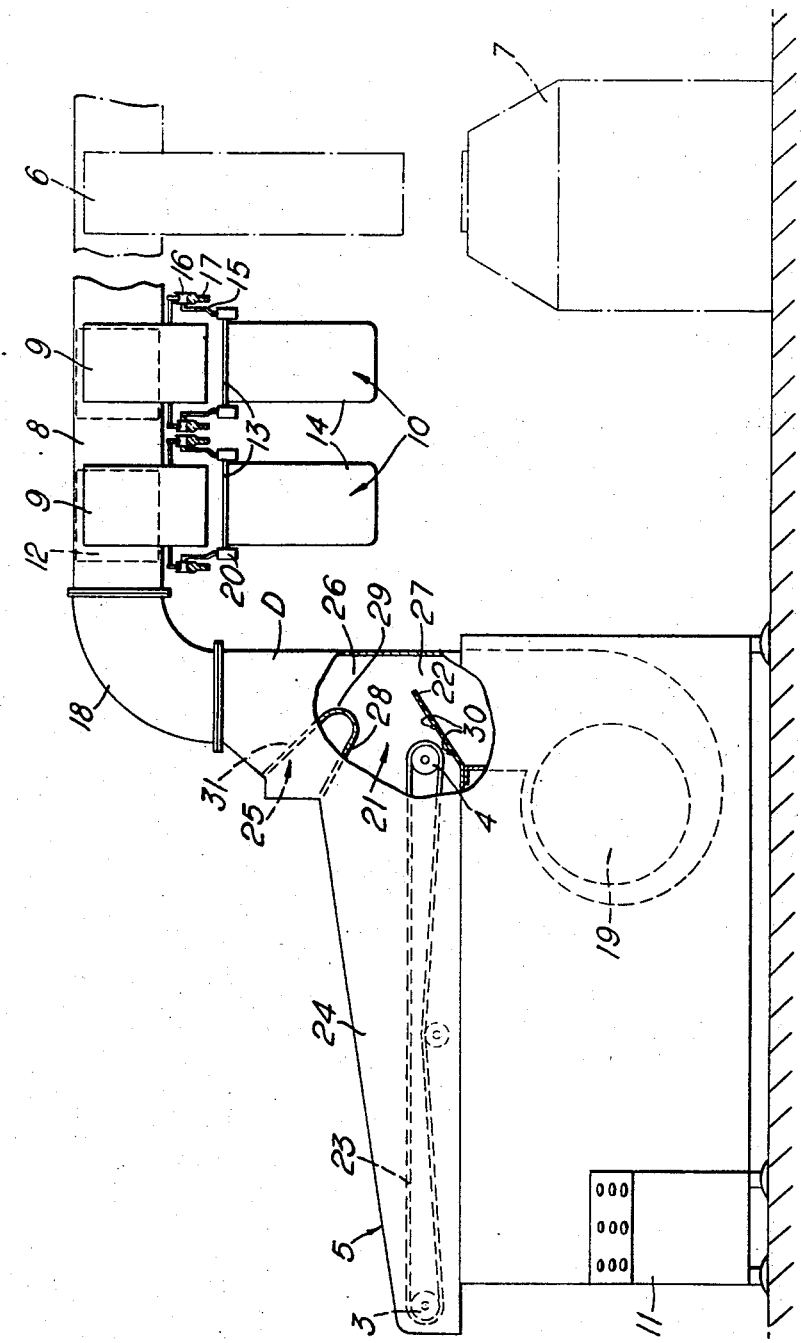
Inventor
Norman Stanley Valentine
By
Watson, Cole, Grindle & Watson
Attorneys

United States Patent Office 3,416,841
Patented Dec. 17, 1968

3,416,841
APPARATUS FOR CONVEYING ARTICLES
Norman Stanley Valentine, Rustington, England, assignor to Polymark Limited
Continuation-in-part of application Ser. No. 528,282, Feb. 17, 1966. This application Sept. 11, 1967, Ser. No. 666,768
3 Claims. (Cl. 302—11)

ABSTRACT OF THE DISCLOSURE

Pneumatic conveying apparatus for textile articles comprising a generally vertical air duct having a lateral opening for receiving articles to be conveyed, means for forcing an air blast upwardly in the duct, a conveyor belt forming the bottom of a generally horizontal trough for delivering articles to the opening, a baffle in said duct on the upstream side of the opening creating a Venturi effect in the area of the opening, said baffle extending transversely from a point beneath the end of the conveyor belt nearest the opening to a point intermediately of the cross-section of the duct, and a guide plate in said duct downstream of the opening creating a divergent passage for progressively reducing the velocity of the air blast beyond said opening. The baffle is provided with louvre openings beneath the said end of the conveyor belt to provide an upward stream of air adjacent the said end of the conveyor belt to promote delivery of the articles into the air blast at said lateral opening and to assist in directing the articles into said duct.

---

The present invention relates to apparatus for conveying articles, such as textile articles, individually by means of a conveying air current, and is particularly directed to that section of the apparatus by which articles are introduced into such a conveying air current. The invention comprises a continuation-in-part of the subject matter disclosed in application Ser. No. 528,282 dated Feb. 17, 1966, now abandoned.

The economical conveyance of textile articles, for example in laundries and dry-cleaning establishments, involves a certain amount of difficulty as a wide range of different sizes and weights of articles may have to be dealt with, ranging for example from an article in the nature of a handkerchief to comparatively bulky articles such as sheets, and it has been found by the present applicant that such articles are capable of being handled efficiently and economically by means of a pneumatic conveyance system. The present invention is more particularly directed to an improvement relating to such conveying systems particularly that section of the equipment by which the articles are introduced individually into the conveying air current.

Apparatus for conveying textile articles being handled in laundries or dry-cleaning establishments has been described in U.S. Patent No. 3,141,705 wherein the articles are introduced into an air current by means of a feeder member, which may be a hopper or a conveyor belt, the articles entering past a pivotally movable member which minimises any reverse flow of the conveying air following the introduction of the articles into the air current.

Furthermore in U.S. Patent No. 3,249,389 apparatus has been described wherein articles are introduced by means of a belt conveyor into an upwardly moving air current in a vertical ductway and an auxiliary belt is provided inclined downwardly towards said belt conveyor to a point in close proximity to the end of the belt conveyor adjacent to the vertical ductway, a pivoted sealing member being provided to prevent reverse flow of air from the ductway. This permits successive and discrete articles to be carried initially in a vertical path to a suitable level for further conveyance or manipulation of the articles or for delivery selectively to a series of containers, the articles being then conveyed in a more or less horizontal direction to at least one discharge point.

For use in laundries the articles may be caused to be discharged directly into washing machines or alternatively, the articles may be discharged into containers movable over or along overhead trackways by which they may be brought to a position over washing machines, being discharged from said containers into the washing machines.

The present invention is particularly directed to the means adopted for supplying articles individually into the conveying air current, and it aims at eliminating the provision of any pivotally movable members adapted to close behind each article as it enters into the conveying air current, and at providing an improved conveying action on the articles.

In prior equipments developed by the inventor and his assignees it was found necessary to provide a pivotally movable member as described in the aforesaid patents, adapted to close behind each article as it enters the conveying air current to prevent outward flow of the conveying air through the opening at which the article is introduced into the conveying air current, and it has now been unexpectedly discovered that such a pivotally movable member need not be provided if the conveying air duct is appropriately arranged to ensure a reduction in pressure at or adjacent to the opening through which the articles are introduced into the air current. This reduction of pressure, preferably to a value below atmospheric pressure, provides an ejection effect which draws additional air into the duct with the articles being introduced therein, and it is believed that this arrangement has the effect of spreading the bulkier type of article lengthwise along the duct through which the article is being conveyed and prevents the article blocking the duct as the article enters the latter. Satisfactory conveyance is thus ensured without using a pivotally movable closure member.

Thus it may be assumed that the leading end of an article entering the duct is drawn into the duct by a pressure reduction at or adjacent the intake opening and that as the leading end of the article enters the duct the conveying action of the air current becomes operative therein to draw the remainder of the article into the duct, thus spreading the article out lengthwise in the duct and ensuring that no or very little blockage of the air duct occurs, with elimination of the rearward and outward flow through the intake opening or at least the reduction of such flow to an insignificant amount such as will not interfere with the inward movement of an article being conveyed. Hence with the present invention it becomes possible to avoid the need for any pivotally movable member engaged by the ingoing articles and thereby avoiding the need for mechanically movable parts at the entry point.

In accordance with the present invention, apparatus for conveying discrete articles by means of a conveying air current comprises a duct within which an air current is maintained, a lateral opening in said duct adapted to receive successive articles to be conveyed in said duct, deflector means within said duct on the upstream side of any adjacent to the inlet opening to regulate the air flow pattern within the duct and to cause the articles to be drawn into said air stream through said inlet opening, and means to provide an additional flow of air through said deflector means to promote entry of the articles into the air stream within the duct.

Preferably such apparatus further comprises a flow control member located on the downstream side of and adjacent to the inlet opening providing a smooth transition from a comparatively restricted cross-sectional flow area adjacent the inlet opening towards the full cross-sectional area of the conveying duct.

Articles may be supplied towards the inlet opening either by means of a conveyor belt which conveniently rises towards the inlet opening, or alternatively a chute or hopper may be provided which is directed downwardly towards the inlet opening.

It will be understood that the deflector means referred to especially when combined with the appropriate shaping of the ductway beyond the opening, provides an approximately Venturi-like flow area for the ductway guiding the air flow adjacent to the opening. Consequently, the velocity of the air current in the part of the duct comprising the opening is increased with consequent reduction of the pressure, and this may be carried out to such an extent that the air pressure at the opening is below atmospheric pressure at least at the time when an article is commencing to enter the duct. This has the effect of drawing the article into the air current within the ductway and promotes smooth entry of the article into the ductway.

One constructional embodiment of the invention is shown by way of example on the accompanying drawing which is a general explanatory view partly in section.

The apparatus comprises a main conveying duct D conveniently of circular or rectangular cross-section extending from a feeder unit illustrated generally at 5 towards a delivery point 6 which may be placed suitably for delivery to a washing machine 7 or the like, as indicated in dotted lines. Alternatively however and as shown in full lines on the drawings, the equipment is shown for selective delivery of articles conveyed in the duct D towards a delivery and distributor unit 8 where articles are delivered selectively through outlets 9 into receiving containers 10, selective control being effected by a keyboard 11 placed adjacent the feeder unit 5.

The keyboard 11 is operatively linked to pivotally movable control plates 12 at the delivery unit 8 to control delivery of the articles to one or other of the containers 10. Each container 10 preferably comprises a rigid upper frame 13 supporting an openwork carrier 14 suitably closed, conveniently in a releasable manner, at its lower end. The frame 13 carries pivot mounting sleeves 20 for opposed upwardly extending cranked rods 15 carrying deeply grooved guide rollers 16 adapted to run on an overhead support rail 17.

The equipment shown and so far referred to may be arranged in various ways. For example the ductway D adjacent to the feeder unit 5 may extend horizontally or in an upward sloping direction somewhat in the manner indicated on FIG. 8 of Patent No. 3,141,705. Alternatively, however, the lower part of the duct D adjacent to the feeder unit 5 may extend vertically or approximately vertically and may then merge into a horizontal section of feed pipe indicated at 18 which extends either towards a single delivery point, as for example where the conveyed articles are delivered on to a washing machine 7, or to delivery and distributor unit such as indicated at 8.

The feeder unit 5 may serve to house a fan or blower mechanism such as a centrifugal fan or an axial flow fan adapted to produce the conveying air current within the duct D. As specifically shown a centrifugal fan 19 may be provided within a table-like portion of the feeder unit 5, the fan feeding directly into the part of the duct D which receives the articles to be conveyed. For this purpose the duct D includes at this point an opening 21 through which articles pass into the duct D, and there is provided in accordance with the present invention, on the upstream side of the opening 21, a deflector member or baffle plate 22 the purpose of which is to restrict the cross-sectional flow area within the duct D adjacent the opening 21 on the upstream side thereof, which operates an aero-dynamic principles in the manner of a Venturi so as to produce a reduction in pressure adjacent to the opening 21 such that articles are drawn into the duct D through the opening 21.

The feeder unit 5 is in the form of an open-topped trough member the base of which is either horizontal or inclined upwardly towards the opening 21 in a manner generally similar to that shown in the aforesaid patent. The base of the trough is formed by a conveyor belt 23 drawn over a guide roller 3 at the end of the unit 5 remote from the duct D and over a second guide roller 4 placed immediately adjacent the opening 21 and above the deflector plate 27. Any suitable means are provided for driving one of the pulleys 3 or 4 from a suitable electric motor, not shown, since such motor and the driving means from it to one of the rollers 3 or 4 follows normal machine practice.

With an arrangement such as that described there is some possibility that articles placed in the trough forming part of the feeder unit 5 and fed towards the opening by the conveyor belt 23 may tend to pass around the pulley 4 as the articles move towards the opening 21 and might cause jamming of the articles. To reduce this possibility a series of transversely extending, upwardly directed louvre-like openings 30 are provided in the deflector plate 22 to produce an air current around the surface of the belt 23 where it traverses the roller 4 to ensure that the leading end of an article passing towards the opening 21 is lifted off the pulley and directed towards the opening where it is picked up by the reduced pressure in the part of the duct D adjacent to the opening 21. This ensures that an article is satisfactorily caused to enter the duct at its leading end and then to pass smoothly into the duct as it is picked up by the air current within the duct. Conveniently the side walls of the open-topped trough provided by the feeder unit 5 are formed by raised lateral guide plates 24.

According to a further feature of the present invention a smooth guide plate 25 may be provided on the downstream side of the inlet opening 21, as indicated on the drawings. This guide plate 25 may be shaped so as to provide a throat part 26 corresponding to a throat part 27 formed between the tip of the fixed plate 22, or equivalent means lying on the upstream side of the opening 21, so as to provide the optimum air flow conditions while maintaining a reduction of pressure at the opening 21 to a value preferably below atmospheric pressure. The guide plate 25 thus includes a wall portion 28 extending approximately perpendicularly to the side wall of the duct D adjacent the opening 21 and then merging through a well-rounded corner 29 into a face 31 which extends obliquely towards the wall of the duct D at a point well above the opening 21.

With this arrangement it will be seen that the reduction of cross-section of the flow area represented by the throat 27 results in a substantial increase in the velocity of the air current and gives a reduction of pressure at the opening 21 conveniently to a value below atmospheric pressure with an ejector action, the air continuing to flow past the throat 26 which is somewhat larger than the throat 27 and then spreading smoothly along the face 31 towards the full cross-sectional area of the duct D, thus allowing the velocity to fall progressively as the air flows within the duct D with a corresponding increase in the pressure acting on the articles being conveyed.

In operation as successive articles are placed on the belt 23 the leading edge of the article approaches the opening 21 and is drawn into the duct D by the combined action of the feed of the belt 23 and the low pressure zone adjacent the opening 21. The leading edge of the article thus passes into the rising part of the duct D and, without completely obstructing the flow area of the duct D, the article is progressively drawn in elongated form into the duct and thus there is little reverse flow of air through the opening 21 as the remainder of the article passes into the duct and is conveyed in the latter while in an elongated or drawn out form, which furthermore avoids or minimises any tendency to blockage of the duct by the articles being conveyed.

What I claim is:

1. Apparatus for conveying discrete textile articles by means of a conveying air current, comprising a vertical air duct having a lateral inlet opening for introducing articles into said duct, means for producing a flow of conveying air through said duct, a trough adapted to receive articles to be conveyed, a conveyor belt forming a base member of said trough, said conveyor belt terminating immediately in advance of said inlet opening, and a baffle plate extending from a point beneath the terminating end of said conveyor belt adjacent said inlet opening to a point intermediately of the cross-section of the duct to regulate the air flow pattern within the duct and to provide a reduced pressure zone by Venturi action at said inlet opening, said baffle plate including additional openings to direct an air stream around the said terminating end of the conveyor belt to ensure that articles on said conveyor belt pass to and enter said inlet opening.

2. Apparatus as claimed in claim 1, wherein the conveyor belt is guided over rollers at the two ends of the trough and the roller at the end of the trough adjacent to the inlet opening lies over the baffle plate and the latter is provided with louvre openings to direct a stream of air over the belt passing around said roller to lift the leading end of an article arriving on the conveyor belt away from the part of the belt traversing the roller to direct it towards and into the inlet opening.

3. Apparatus as claimed in claim 1, further comprising a guide plate above said inlet opening having a divergently disposed wall part extending upwardly of a throat portion immediately above the inlet opening, said divergent wall part being approximately in line with the tip of the baffle plate.

References Cited

UNITED STATES PATENTS

| 2,898,157 | 8/1959 | Hallworth | 302—36 |
| 3,141,705 | 7/1964 | Valentine | 302—28 |
| 3,210,130 | 10/1965 | Kelly | 302—36 |
| 3,249,389 | 5/1966 | Lemon et al. | 302—28 |

ANDRES H. NIELSEN, *Primary Examiner.*